United States Patent
Tohji et al.

(10) Patent No.: US 7,608,557 B2
(45) Date of Patent: Oct. 27, 2009

(54) HIGHLY ACTIVE PHOTOCATALYST AND PROCESS FOR PRODUCING THE SAME

(75) Inventors: Kazuyuki Tohji, Sendai (JP); Akira Kishimoto, Nishitama-gun (JP); Takafumi Atarashi, Nishitama-gun (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 0 days.

(21) Appl. No.: 10/518,934

(22) PCT Filed: Jun. 5, 2003

(86) PCT No.: PCT/JP03/07160

§ 371 (c)(1),
(2), (4) Date: Dec. 22, 2004

(87) PCT Pub. No.: WO04/000459

PCT Pub. Date: Dec. 31, 2003

(65) Prior Publication Data

US 2005/0215421 A1    Sep. 29, 2005

(30) Foreign Application Priority Data

Jun. 25, 2002   (JP)   ............... 2002-184748

(51) Int. Cl.
| | |
|---|---|
| B01J 27/02 | (2006.01) |
| B01J 27/045 | (2006.01) |
| B01J 23/58 | (2006.01) |
| B01J 23/02 | (2006.01) |
| B01J 23/06 | (2006.01) |
| C01G 9/08 | (2006.01) |
| C01G 11/02 | (2006.01) |
| C01G 13/00 | (2006.01) |
| C09K 11/54 | (2006.01) |
| C09K 11/56 | (2006.01) |
| C09K 11/70 | (2006.01) |
| C09K 11/72 | (2006.01) |
| C09K 11/77 | (2006.01) |
| H01C 13/00 | (2006.01) |
| C09B 67/00 | (2006.01) |
| H01B 1/22 | (2006.01) |
| H01B 1/02 | (2006.01) |
| H01B 1/08 | (2006.01) |

(52) U.S. Cl. ............... 502/200; 502/216; 502/223; 502/328; 502/340; 423/566.1; 252/501.1; 252/514; 252/518.1; 252/519.1; 252/521.6; 252/519.4; 252/301.6 R; 252/301.6 S (58) Field of Classification Search ............... 502/216, 502/223, 328, 340, 200; 423/566.1; 252/501.1, 252/514, 518.1, 519.1, 521.6, 519.14, 301.6 R, 252/301.6 S See application file for complete search history.

(56) References Cited

U.S. PATENT DOCUMENTS 4,041,140 A * 8/1977 Nitta et al. ............ 264/643
(Continued)

FOREIGN PATENT DOCUMENTS

JP          5-027178 A       2/1993
(Continued)

OTHER PUBLICATIONS

"Significantly improved photocatalytic hydrogen production activity over Cd(1-x) Zn(x)S photoctalysts prepared by a novel thermal sulfuration method," Kai Zhang et al. International Journal of Hydrogen Energy 32 (2007), pp. 4685-4691.*
(Continued)

*Primary Examiner*—Patricia L Hailey
(74) *Attorney, Agent, or Firm*—Sughrue Mion, PLLC (57) ABSTRACT

Provided are a photocatalyst which is high in catalytic activity, is nontoxic, has a long life, allows visible light to be used directly for its photocatalytic reaction and is especially useful for hydrogen generation, and a process for producing it. It contains a cadmium compound, has a capsular structure, has an average particle diameter of 100 nm or less and can be manufactured by dropping a solution of a cadmium salt into a solution of a sodium compound or admixing a solution of a sodium compound in a suspension of particles of a cadmium compound.

22 Claims, 3 Drawing Sheets

U.S. PATENT DOCUMENTS

| | | | |
|---|---|---|---|
| 4,197,122 A * | 4/1980 | Kawashima et al. | 430/94 |
| 4,204,933 A | 5/1980 | Barlow et al. | |
| 4,242,374 A * | 12/1980 | Sansregret | 427/76 |
| 4,366,222 A | 12/1982 | Feinleib | |
| 4,427,749 A | 1/1984 | Graetzel | |
| 4,447,335 A | 5/1984 | Loeffler et al. | |
| 4,461,753 A * | 7/1984 | Suzuki et al. | 423/566.1 |
| 4,484,992 A * | 11/1984 | Buhler et al. | 204/157.52 |
| 4,863,608 A * | 9/1989 | Kawai et al. | 210/638 |
| 6,051,614 A * | 4/2000 | Hirai et al. | 516/20 |
| 6,248,218 B1 * | 6/2001 | Linkous et al. | 204/157.49 |
| 6,415,806 B1 | 7/2002 | Gillis | |
| 6,524,997 B1 * | 2/2003 | Higo et al. | 502/439 |
| 6,572,829 B2 * | 6/2003 | Linkous et al. | 422/186.03 |
| 6,841,142 B1 | 1/2005 | Tenne et al. | |
| 7,381,465 B2 * | 6/2008 | Torimoto et al. | 428/403 |
| 2005/0181942 A1 | 8/2005 | Tohji et al. | |

FOREIGN PATENT DOCUMENTS

| | | | |
|---|---|---|---|
| JP | 06-148172 | * | 5/1994 |
| JP | 7-313884 A | | 12/1995 |
| JP | 10-310401 | * | 11/1998 |
| JP | 2000-051709 A | | 2/2000 |
| JP | 2001-157843 A | | 6/2001 |
| JP | 2001-190964 A | | 7/2001 |
| JP | 2001-239164 A | | 9/2001 |

OTHER PUBLICATIONS

"Fabrication of CdS-ZnS layered thin films by hydrothermal seeded growth method," Tong Ren et al. Thin Solid Films (2006), pp. 99-102.*

"Effect of platinum loading on the photocatalytic activity of cadmium (II) sulfide particles suspended in aqueous amino acid solutions," B. Ohtani et al. Journal of Photochemistry and Photobiology A: Chemistry 90 (1995), pp. 75-80.*

Takeo Arai et al., "Stratified CdS Hikari Shokubai o Mochiita Kashiko ni yoru Suiso Seiiku", Shigen • Sozai Gakkai Shunki Taikai Koenshu, Mar. 28, 2002, No. 2, pp. 126 to 127.

Kazuyuki Toji, "Iou Riyo no Shintenkai -Taiyoko o Riyo shite Ryuka Suiso kara Suiso o Tsukuru-" Sulphuric Acid and Industry, Jan. 15, 2002, vol. 55, No. 1, pp. 7 to 14.

Kazuyuki Toji, "Stratified Hikari Shokubai o Mochiita Taiyoko ni yoru Suiso no Seiiku", Shigen• Sozai, Sep. 24, 2001, vol. 2001, No. C/D, pp. 137 to 140.

Kozo Shinoda et al., "Yoeki Kagaku Hanno o Riyo shita Kinzoku Ryukabutsu Handotai Hikari Shokubai no Sakusei to sono Tokusei", Shigen • Sozai Gakkai Shunki Taikai Koenshu, Mar. 27, 2003, No. 2, pp. 132 to 133.

International Search Report for PCT/JP2003-07160 dated Sep. 2, 2003.

Kazuyuki Tau, "Ekiteki Hyomen deno Stratified Keisie to sono Shokubai eno Oyo", 1998, vol. 68, No. 4, pp. 307 to 314.

Machine English translation of JP2001-190964 from JPO website.
Machine English translation of JP2001-157843 from JPO website.
Machine English translation of JP07-313884 from JPO website.

* cited by examiner

HIGHLY ACTIVE PHOTOCATALYST AND PROCESS FOR PRODUCING THE SAME

FIELD OF THE INVENTION

This invention relates to a photocatalyst and a process for producing the same and more particularly to a photo-catalyst which is high in catalytic activity, is nontoxic, has a long life, allows visible light to be used directly for its photocatalytic reaction and is especially useful for hydrogen generation, etc., and a process for producing it.

BACKGROUND ART

The production of chemical energy from solar energy, or the use of inexhaustible and clean hydrogen energy is one of the dreams which the human beings have. The practical application of this energy can solve the energy problem faced by the 21st century, the warming of the earth by carbon dioxide as brought about by fossil energy and environmental pollution as by acid rain.

The Honda-Fujishima effect announced by A. Fujishima, et al, Nature, 238, 37 (1972) was the first attempt to show that the energy of light can be used to decompose water into oxygen and hydrogen. When the oil crisis was thereafter questioned all over the world, a lot of studies were actively made for converting the energy of light to chemical energy in accordance with that principle. The conversion efficiency for the energy of light in the visible range is, however, still to be improved. The result of the active studies made from 1980 to 1990 is that they have shown that the conversion efficiency is dictated by the recombination of electrons and holes formed by photoexcitation when it occurs before they reach the reaction sites for the decomposition of water. In accordance with this conclusion, an attempt has been made to use an intercalation compound to separate the reaction sites (S. Ikeda, et al, J. Mater. Res., 13, 852 (1998)). No satisfactory conversion efficiency in the visible range has, however, been achieved as yet, though the conversion efficiency has gradually been improved. This is due to the fact that no perfect separation of the reaction sites or of electrons and holes has been achieved.

Besides the studies mentioned above, there have also been made studies of reaction systems for generating hydrogen by utilizing the absorption of light by ions in a solution. J. Jortner, et al, J. Phys. Chem., 68, 247 (1964) showed the generation of hydrogen at a high quantum efficiency in an acid solution containing an iodine ion, and K. Hara, et al, J. Photochem. Photobiolo., A128, 27 (1999) in an alkaline solution containing a sulfur ion. All of these reactions are, however, made possible by ultraviolet light of high energy having a wavelength of 250 nm or less.

As to the application of photocatalytic technology, its practical application has begun in antibacterial tiles, antibacterial and deodorant filters for air cleaners, etc. owing to its property of promoting various chemical reactions, such as the degradation of environmental pollutants, sources of offensive odors and bacteria. Moreover, it is possible to obtain a useful chemical substance by reacting a harmful substance with a photocatalyst. For example, application to a desulfurization process for crude oil will be possible.

The desulfurization process for crude oil which is generally employed at present hydrogenates heavy naphtha during the distillation of crude oil and recovers all the sulfur components of crude oil as hydrogen sulfide. It recovers hydrogen sulfide by oxidizing sulfur through a process called the Claus process. The Claus process is a process which oxidizes one-third of hydrogen sulfide into sulfur dioxide and reacts it with the remaining hydrogen sulfide to form elemental sulfur.

This process requires enormous energy, since it not only carries out the catalytic reaction of sulfur dioxide and hydrogen sulfide, but also repeats heating and condensation. Other problems thereof include the expensive control of sulfur dioxide.

If it is possible to put into practice a method in which a photocatalyst is added to alkaline water containing hydrogen sulfide dissolved therein, and is irradiated with ultraviolet rays, so that free electrons and holes generated by the photocatalyst absorbing the energy of ultraviolet light may oxidize and reduce the alkaline water containing hydrogen sulfide to produce hydrogen and sulfur, or a method in which hydrogen sulfide is decomposed by a photocatalyst into hydrogen and sulfur, it will be possible to decompose hydrogen sulfide as an harmful substance and produce hydrogen and sulfur as useful substances with a smaller amount of energy. In other words, it will be possible to contribute to solving an environmental problem and produce useful substances inexpensively.

The photocatalysts so far available have, however, had problems to be solved, as will now be stated. Firstly, they are low in catalytic activity. Secondly, they are toxic. They are low in catalytic activity, since it is highly probable that the free electrons and holes which are formed upon application of light to a photocatalyst may undergo recombination, and it is also highly probable that the chemical substances separated by an oxidation-reduction reaction may recombine into the original compound.

Thirdly, the catalysts have only a short life. They have a problem of being dissolved by light. The free electrons and holes which are formed upon application of light to a photocatalyst produce a strong oxidation-reduction reaction by which not only the chemical substances as intended, but also the catalyst itself is oxidized and reduced, is dissolved and loses its catalytic action.

Under these circumstances, JP-A-2001-190964 has disclosed a photocatalyst having a high catalytic activity, having no toxicity and having a long life, and overcome the three problems as stated above.

JP-A-2001-190964, however, discloses only a photo-catalyst composed of ZnS. As the band gap of ZnS is in the ultraviolet range, it has been impossible to utilize visible light, such as solar light, an inexhaustible and clean source of energy, directly for a photocatalytic reaction.

It is, therefore, an object of this invention to overcome the drawbacks of the prior art as stated above and provide a photocatalyst which is high in catalytic activity, is nontoxic, has a long life, allows visible light to be used directly for a photocatalytic reaction and is especially useful for hydrogen generation, and a process for producing the same.

DISCLOSURE OF THE INVENTION

As a result of intensive investigations, the inventors of the invention have been able to solve the above problems by adopting the features as set forth below.

This invention is, therefore, as follows:

(1) A photocatalyst containing a cadmium compound, having a capsular structure and having an average particle diameter of 100 nm or less.

(2) The photocatalyst according to the above (1), wherein the average particle diameter is 50 nm or less.

(3) The photocatalyst according to the above (1), wherein the cadmium compound is cadmium sulfide.

(4) The photocatalyst according to the above (1), characterized by supporting a Group 8 to 11 metal.

(5) The photocatalyst according to the above (4), characterized in that the metal is platinum.

(6) The photocatalyst according to the above (1), which has a pore extending from its surface to its interior.

(7) The photocatalyst according to the above (6), which has a multiplicity of such pores.

(8) A process for producing a photocatalyst, which comprises dropping a solution of a cadmium salt into a solution of a sodium compound.

(9) The process for producing a photocatalyst according to the above (8), wherein the solution of a sodium compound contains sodium sulfite.

(10) The process for producing a photocatalyst according to the above (8), wherein the solution of a sodium compound contains sodium sulfide.

(11) The process for producing a photocatalyst according to the above (8), wherein the cadmium salt is cadmium nitrate.

(12) A process for producing a photocatalyst, which comprises admixing a solution of a sodium compound in a suspension of particles of a cadmium compound.

(13) The process for producing a photocatalyst according to the above (12), wherein the cadmium compound is cadmium hydroxide.

(14) The process for producing a photocatalyst according to the above (12), wherein the cadmium compound is cadmium oxide.

(15) The process for producing a photocatalyst according to the above (12), wherein the suspension of particles of a cadmium compound is prepared by mixing a solution of cadmium nitrate with a solution containing sodium hydroxide.

(16) The process for producing a photocatalyst according to the above (15), wherein the solution containing sodium hydroxide contains a chloride.

(17) The process for producing a photocatalyst according to the above (16), wherein the chloride is sodium chloride.

(18) The process for producing a photocatalyst according to the above (12), wherein the sodium compound is sodium sulfide.

(19) The process for producing a photocatalyst according to the above (8) or (12), wherein photocatalyst particles as obtained are caused to support a Group 8 to 11 metal.

(20) The process for producing a photocatalyst according to the above (19), wherein the metal is platinum.

(21) The process for producing a photocatalyst according to the above (8) or (12), which further comprises suspending photocatalyst particles as obtained in a solution containing sodium sulfite and applying light thereto.

(22) The process for producing a photocatalyst according to the above (21), wherein the light is visible light.

(23) The process for producing a photocatalyst according to the above (21), wherein the light is solar or pseudo-solar light.

The photocatalyst of the invention, which contains a cadmium compound, allows the use of visible light, such as solar light, an inexhaustible and clean source of natural energy, directly for its photocatalytic reaction, is nontoxic and has a long life.

The photocatalyst composed of simple particles of a cadmium compound which has so far been available has had only a very low efficiency for conversion of the energy of light.

The photocatalyst of this invention is, however, of a capsular structure having a shell containing a cadmium compound and a cavity and an electrical field existing between the outer and inner surfaces of the capsular shell containing a cadmium compound is considered to make it possible to decrease the recombination of free electrons and holes formed by the application of visible light, such as solar light, and also the recombination of a product of an oxidizing reaction and a product of a reducing reaction and thereby achieve a high catalytic activity.

The operational mechanism as described enables this invention to have a high catalytic activity, be nontoxic, have a long life, allow the use of visible light directly for its photocatalytic reaction and be particularly useful for hydrogen generation.

The photocatalyst of this invention and a method of manufacturing it will now be described in detail.

For the purpose of this invention, the cadmium compound is not particularly limited if it has catalytic activity, but it may, for example, be one composed of cadmium and a Group 16 element, and more specifically, cadmium sulfide, cadmium selenide or cadmium telluride, though cadmium sulfide is the most suitable.

The average particle diameter of the photocatalyst of this invention having a capsular structure is not particularly limited if it is 100 nm or less, but it is preferably 50 nm or less, since a smaller particle diameter preferably brings about a larger surface area per unit mass and thereby a higher spectral catalytic activity.

The average particle diameter of the photocatalyst of this invention having a capsular structure is determined by a method as described below.

Several photographs showing several to several tens of catalyst particles are taken through an electron microscope, the major diameters of the individual particles are measured and their average is calculated.

The photocatalyst of this invention preferably supports a Group 8 to 11 metal to have a still higher photocatalytic activity.

The Group 8 to 11 metal is a metal selected from among Pt, Ru, Ir, Co, Rh, Cu, Pd and Ni or an oxide thereof and platinum is, among others, preferred. Its amount supported is not particularly limited, but is preferably in the range of 0.1 to 10% by weight.

Less than 0.1% by weight presents the problems of a reduction in the amount of hydrogen which is generated, and a lowering in the stability of the catalyst, while over 10% by weight presents the problems of not only an unexpected reduction in the amount of hydrogen which is generated, but also an increase in the manufacturing cost of the catalyst.

Description will now be made of the structure of the photocatalyst of this invention.

The photocatalyst according to this invention has a shell containing a cadmium compound and a cavity. The shell of the photocatalyst of this invention is of a stratified structure formed by an ultrafine particle layer of a cadmium compound having a particle diameter of 1 to 10 nm, so that a photocatalyst like that of this invention is known also as a stratified photocatalyst. Moreover, the shell having a stratified structure in the photocatalyst of this invention is likely to have a structure in which the ratio of its components like cadmium and a Group 16 element as stated before varies along its layer thickness. As a result, it is considered that an electrical field existing along its layer thickness makes it possible to decrease the recombination of free electrons and holes formed by the application of visible light, such as solar light, and also the recombination of a product of an oxidizing reaction and a product of a reducing reaction and thereby achieve a high catalytic activity. As the shell in the photocatalyst of this invention is of a stratified structure formed by an ultrafine particle layer of a cadmium compound having a particle diameter of 1 to 10 nm, it has innumerable pores defined by the interstices existing among the ultrafine particles and connected to one another.

Figure 1:
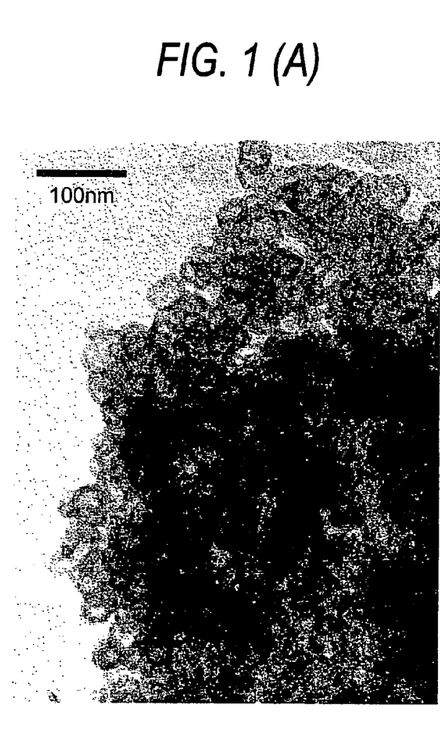

FIG. 1(A) is a transmission electron micrograph taken of a mass of substances like layers of ultrafine particles of cadmium sulfide as one form of the photocatalyst according to this invention. FIG. 1(B) is an enlarged portion of FIG. 1(A).

As is obvious from the photograph, it is of a capsular structure formed by several-nanometer ultrafine particles of CdS.

Measurement by a micro-region EDX has confirmed as platinum the black portion on the outside of one substance like a layer of ultrafine particles of cadmium sulfide as enlarged in FIG. 1(B).

While there is no particular limitation in a process for producing the photocatalyst of the invention, it is possible to mention as the simplest method a process for producing it by dissolving several ten to several hundred-nanometer particles of a cadmium compound not having photocatalytic activity from their surfaces in an aqueous solution containing ions like the Group 16 element as stated before, and thereby depositing about one to 10-nanometer nano-fine particles of cadmium compound having photocatalytic activity in the vicinity of the dissolved parts of the several ten to several hundred-nanometer particles.

The cadmium compound not having photocatalytic activity is not particularly limited, but is preferably cadmium oxide or hydroxide.

The aqueous solution containing the Group 16 element, etc. is not particularly limited, either, but is preferably a solution of a sodium compound.

Thus, it is possible to mention a method comprising admixing a solution of a sodium compound in a suspension of cadmium oxide or hydroxide particles as one method of manufacturing the photocatalyst of this invention.

The sodium compound is not particularly limited, but is preferably sodium sulfide.

The features of the manufacturing method described above will be described by referring as an example to cadmium sulfide which is a preferred form of cadmium compound having photocatalytic activity. Fine particles of cadmium oxide or hydroxide and an aqueous solution of sodium sulfide as raw materials are mixed and if the mixed solution is stirred, cadmium oxide or hydroxide reacts with water to form cadmate ions dissolved in the aqueous solution. The cadmate ions react with sulfur ions in the aqueous solution of sodium sulfide and form cadmium sulfide. The cadmium sulfide is deposited on the surfaces of the cadmium oxide or hydroxide particles as the raw material and forms a layer of fine particles of cadmium sulfide. Upon formation of the layer of fine particles of cadmium sulfide, water permeates through the layer, reaches the surface of cadmium oxide or hydroxide as the raw material and reacts with the cadmium oxide or hydroxide to form cadmate ions. The cadmate ions are diffused through the layer of fine particles of cadmium sulfide, reach its surface and react with sulfur ions to form cadmium sulfide, which is deposited on the layer of fine particles of cadmium sulfide. The growth of the layer of fine particles of cadmium sulfide makes it difficult for cadmate ions to diffuse through the layer, resulting in the deposition of cadmium sulfide deviating from a stoichiometric composition.

Ultraviolet irradiation may be employed to increase the rate of formation of the layer of fine particles of cadmium compound (cadmium sulfide). Fine particles of cadmium oxide or hydroxide and an aqueous solution of sodium sulfide are mixed together and irradiated with ultraviolet rays so that the dissolution of cadmium oxide or hydroxide under light may facilitate the dissolution of cadmate ions and thereby accelerate the growth of the layer of fine particles of cadmium compound.

It is also possible to dissolve hydrogen sulfide to increase the rate of formation of the layer of fine particles of cadmium compound. Hydrogen sulfide may be dissolved in a mixed solution of fine particles of cadmium oxide or hydroxide and water to form a weakly acid solution containing sulfur ions to accelerate the growth of the layer of fine particles of cadmium compound, since cadmium oxide or hydroxide is well soluble in a weakly acid solution.

Ultraviolet irradiation and the dissolution of hydrogen sulfide may be combined to increase the rate of formation of the layer of fine particles of cadmium compound. Fine particles of cadmium oxide or hydroxide, an aqueous solution of sodium sulfide and hydrogen sulfide are mixed together, irradiated with ultraviolet rays and stirred to accelerate the growth of the layer of fine particles of cadmium compound to a further extent.

These methods as described make it possible to produce a layer of fine particles of a cadmium compound forming the photocatalyst of this invention.

In an aqueous solution of sodium sulfide ($Na_2S$), cadmium oxide (CdO) or cadmium hydroxide ($Cd(OH)_2$) is dissolved from the surfaces of cadmium oxide or hydroxide particles to form cadmate ions ($CdO^{2-}$). The cadmate ions react with sulfur ions ($S^{2-}$) in the aqueous solution of sodium sulfide ($Na_2S$) and form a cadmium compound (CdS). The cadmium compound is deposited on the surface of cadmium oxide or hydroxide and forms a layer of fine particles of cadmium compound. Upon formation of the layer of fine particles of cadmium compound, water permeates through the layer, reaches the surface of cadmium oxide or hydroxide as the raw material and reacts with the cadmium oxide or hydroxide to form cadmate ions. The cadmate ions are diffused through the layer of fine particles of cadmium compound and reach its surface opposite that in which it faces the cadmium oxide or hydroxide particles, namely its outer surface. In that surface, the cadmate ions react with sulfur ions and form the cadmium compound, which is deposited on the layer of fine particles of cadmium compound, whereby the layer of fine particles of cadmium compound is considered to grow.

It is considered that the process of formation as described causes an internal cavity to be formed by a missing volume corresponding to a part of cadmium oxide or hydroxide particles dissolved away to form cadmate ions.

It is considered that when one of the components of a chemical reaction is supplied by diffusion and when the reaction product forms a diffusion layer as described, the growth of the diffusion layer results in a gradual decrease in the amount of the one component which is supplied, and the formation of a layer varying in chemical composition. Thus, the layer of fine particles of cadmium compound forming the photocatalyst according to this invention is considered to have a structure featured by a ratio of cadmium (Cd) and sulfur (S) varying across its thickness.

The particles of a cadmium compound not having photocatalytic activity which is used by the manufacturing method described above may be commercially available ones, or appropriately prepared ones.

As regards a method of preparing a cadmium compound not having photocatalytic activity, there is no particular limitation, but it is possible to mention a method in which a solution of cadmium nitrate is mixed with a solution containing sodium hydroxide.

The particle diameter of the photocatalyst to be manufactured may be appropriately controlled in accordance with the intended catalytic action thereof, and as regards a method of controlling its particle diameter, it is possible to mention controlling the particle diameter of the particles of a cadmium compound not having photocatalytic activity.

As regards a method of controlling the particle diameter of the particles of a cadmium compound, there is no particular limitation, but it is preferable to have a chloride dissolved in the solution containing sodium hydroxide when the particles of a cadmium compound are prepared.

The chloride is not particularly limited, but may, for example, be sodium or potassium chloride, though sodium chloride is preferred.

As another form of a process for producing the photocatalyst of the invention, it is possible to mention a method in which shells of capsules containing a cadmium compound having photocatalytic activity are formed directly without employing any particles of a cadmium compound not having photocatalytic activity.

As such a manufacturing method, it is possible to mention, for example, a method in which a cadmium salt solution is dropped into a solution of a sodium compound.

Although the functional mechanism of this method is not clear, it is considered that a cadmium salt dropped into a solution of a sodium compound will first form a microscopic solid phase of cadmium hydroxide, etc. and then turn into a cadmium compound instantaneously to form the shells of capsules of the photocatalyst of this invention.

The solution of a sodium compound preferably contains sodium sulfite or sulfide. The cadmium salt is preferably cadmium nitrate.

Although the photocatalyst of this invention preferably supports a Group 8 to 11 metal like platinum as stated before, there is no particular limitation as to a method of having it supported.

The photocatalyst particles produced by the manufacturing methods as described, or the like are preferably suspended in a solution containing sodium sulfite and exposed to light to have their photocatalytic activity raised.

The light is preferably visible light, such as solar or pseudo-solar light.

The following is a list of specific process for producing the photocatalyst of the invention.

Process for Producing a Photocatalyst According to a First Form of Embodiment:

Sodium chloride is dissolved in a solution of sodium hydroxide, a solution of cadmium nitrate is dropped and mixed into that solution and the mixed solution is stirred at room temperature to prepare a suspension of cadmium hydroxide particles having a white color. A solution of sodium sulfide is mixed with the suspension and the mixture is stirred. As a result, there is obtained a suspension of CdS particles. Then, a solution of hexachloroplatinic acid is added to the suspension and after stirring, it is irradiated with ultraviolet light by using a mercury lamp type ultraviolet irradiating device.

After its treatment as described, it is filtered under suction through a nitro cellulose membrane filter (having a pore diameter of 0.2 μm), washed with distilled water and dried in a tank having a constant temperature of 60° C.

Process for Producing a Photocatalyst According to a Second Form of Embodiment:

A solution of sodium sulfide and/or a solution of sodium sulfite is diluted with deionized water, a solution of cadmium nitrate is dropped into the dilution at a dropping rate and it is stirred. As a result, there is obtained a suspension of capsular CdS particles. Then, a solution of hexachloroplatinic acid is added to the suspension and after stirring, it is irradiated with ultraviolet light by using a mercury lamp type ultraviolet irradiating device.

After its treatment as described, it is filtered under suction through a membrane filter, washed with distilled water and dried in a tank having a constant temperature of 60° C.

BRIEF DESCRIPTION OF THE DRAWINGS

FIG. 1(A) is an electron micrograph showing the process of formation of a photocatalyst according to this invention and (B) is an enlarged portion thereof.

BEST MODE FOR CARRYING OUT THE INVENTION

The invention will now be described more specifically by examples, though they are, of course, not intended for limiting the scope of this invention.

EXAMPLE 1

(Process 1 for Producing a Photocatalyst)

4.0 g of sodium chloride were dissolved in 100 ml of a 0.1 M solution of sodium hydroxide (solution (1)). Solution (1) and 100 ml of a 0.01 M solution of cadmium nitrate were mixed and stirred at room temperature. As a result, there was obtained a suspension of cadmium hydroxide particles having a white color (solution (2)). 5 ml of a 0.1 M solution of sodium sulfide were mixed with solution (2). As a result, there was obtained a suspension of particles having an intermediate color between orange and brown (solution (3)). 10 ml of a $9.65 \times 10^{-3}$ M solution of hexachloroplatinic acid were added to solution (3), stirring was continued for two minutes (solution (4)) and it was irradiated with ultraviolet light for five minutes by using a mercury lamp type ultraviolet irradiating device (solution (5)).

Solution (5) was filtered under suction by using a membrane filter having a diameter of 47 mm and a pore diameter of 0.2 um (6). The solid as obtained at (6) with the filter was placed in a desiccator and dried at room temperature to 60° C. As a result, there were obtained having a reddish brown color on the filter (7). The particles as obtained at (7) were suspended in a mixture of 50 ml of a 0.1 M solution of sodium sulfide and 10 ml of a 1 M solution of sodium sulfite and the suspension was irradiated with pseudo-solar light by using a 500 W Xe lamp.

As a result, the color of the particles changed from reddish brown to greenish brown and hydrogen was generated. The suspension was filtered under suction and the resulting photocatalyst powder was dried with the filter. As a result, there were obtained photocatalyst particles having a greenish brown color on the filter and the catalyst particles weighed about 110 mg and had a particle diameter of 46 nm.

EXAMPLE 2

(Process 2 for Producing a Photocatalyst)

Example 1 was repeated except using 100 ml of a 0.1 M solution of sodium sulfite instead of 100 ml of a 0.1 M solution of sodium hydroxide in solution (1) according to Process 1 for Producing a Photocatalyst (Example 1). Photocatalyst particles having a greenish brown color were obtained on the filter, weighed about 110 mg and had a particle diameter of 62 nm.

EXAMPLE 3

(Process 3 for Producing a Photocatalyst)

1 ml of a 0.1 M solution of sodium sulfide and 1 ml of a 1 M solution of sodium sulfite were mixed together (solution (1)). Solution (1) was diluted with deionized water until a total volume of 100 ml (solution (2)). 10 ml of a 0.05 M solution of cadmium nitrate were dropped into solution (2) at a dropping rate of 13.9 ml/min. and stirring was continued for two minutes. As a result, there was obtained a suspension of particles having an intermediate color between yellow and orange (solution (3)). 1.5 ml of a $9.65 \times 10^{-3}$ M solution of hexachloroplatinic acid were added to solution (3) and stirring was continued for two minutes (solution (4)). Solution (4) was irradiated with ultraviolet light for two minutes by using a mercury lamp type ultraviolet irradiating device.

As a result, there was obtained a suspension of particles having an intermediate color between orange and brown (solution (5)). Solution (5) was filtered under suction by using a membrane filter having a diameter of 47 mm and a pore diameter of 0.2 um (6). The solid as obtained at (6) with the filter was placed in a desiccator and dried at room temperature to 60° C. As a result, there were obtained having a reddish brown color on the filter (7). The particles as obtained at (7) were suspended in a mixture of 50 ml of a 0.1 M solution of sodium sulfide and 10 ml of a 1 M solution of sodium sulfite and the suspension was irradiated with pseudo-solar light by using a 500 W Xe lamp. As a result, the color of the particles changed from reddish brown to greenish brown and hydrogen was generated.

The suspension was filtered under suction and the resulting photocatalyst powder was dried with the filter. As a result, there were obtained photocatalyst particles having a greenish brown color on the filter and the catalyst particles weighed about 40 mg and had a particle diameter of 70 nm.

COMPARATIVE EXAMPLE 1

Example 1 (including sulfurizing treatment and treatment for having platinum supported) was repeated except using a suspension of 100 mg of CdO as a commercially available reagent (product of Kou-Jundo Kagaku-Sha having a particle diameter of 300 to 400 nm) instead of the suspension of particles as solution (2) according to Process 1 for Producing a Photocatalyst (Example 1). Photocatalyst particles having a greenish brown color were obtained on the filter, weighed about 110 mg and had a particle diameter of 355 nm.

COMPARATIVE EXAMPLE 2

0.5 ml of a 0.1 M solution of sodium sulfide was diluted with deionized water until a total volume of 50 ml (solution (2)). 50 ml of a 0.01 M solution of cadmium nitrate were put in and mixed with solution (2). As a result, there was obtained a suspension of CdS particles having an intermediate color between orange and brown (and having a primary particle diameter of 5 nm) (solution (3)). Steps (4) and (5) of Example 1 (treatment for having platinum supported) were repeated except solution (3) used and there were obtained photocatalyst particles having a dark brown color and not having a capsular structure on the filter, which particles weighed about 50 mg and had a particle diameter of 7 nm.

COMPARATIVE EXAMPLE 3

Comparative Example 2 was repeated. Steps 4 and 5 of Example 1 (treatment for having platinum supported) were, however, eliminated. There were obtained photocatalyst particles having an intermediate color between orange and brown and not having a capsular structure on the filter, which particles weighed about 50 mg and had a particle diameter of 6 nm.

COMPARATIVE EXAMPLE 4

Comparative Example 3 including the elimination of steps for treatment for having platinum supported was repeated except using a suspension of 100 mg of CdS as a commercially available reagent (product of Kou-Jundo Kagaku-Sha having a particle diameter of 30 to 40 nm) instead of the prepared CdS particles according to Comparative Example 3, and Photocatalyst particles having a dark brown color and not having a capsular structure were obtained on the filter. The catalyst particles weighed about 100 mg and had a particle diameter of 42 nm.

<Evaluation of Photocatalysts>

The amounts of hydrogen generated by the photocatalyst particles obtained from the Examples and Comparative Examples stated above were measured by a testing method as described below.

(Testing Method for Measuring the Amount of Hydrogen Generated)

A device for measuring the amount of hydrogen generated, including a burette, was charged with 100 mg of photocatalyst particles. Then, the device for measuring the amount of hydrogen generated was charged with 140 ml of a 0.1 M solution of sodium sulfide.

Pseudo-solar light having an intensity of 50 mW/cm$^2$ was applied from below the device by using a 500 W Xe lamp and the amount of hydrogen generated was measured every ten minutes.

Figure 2:
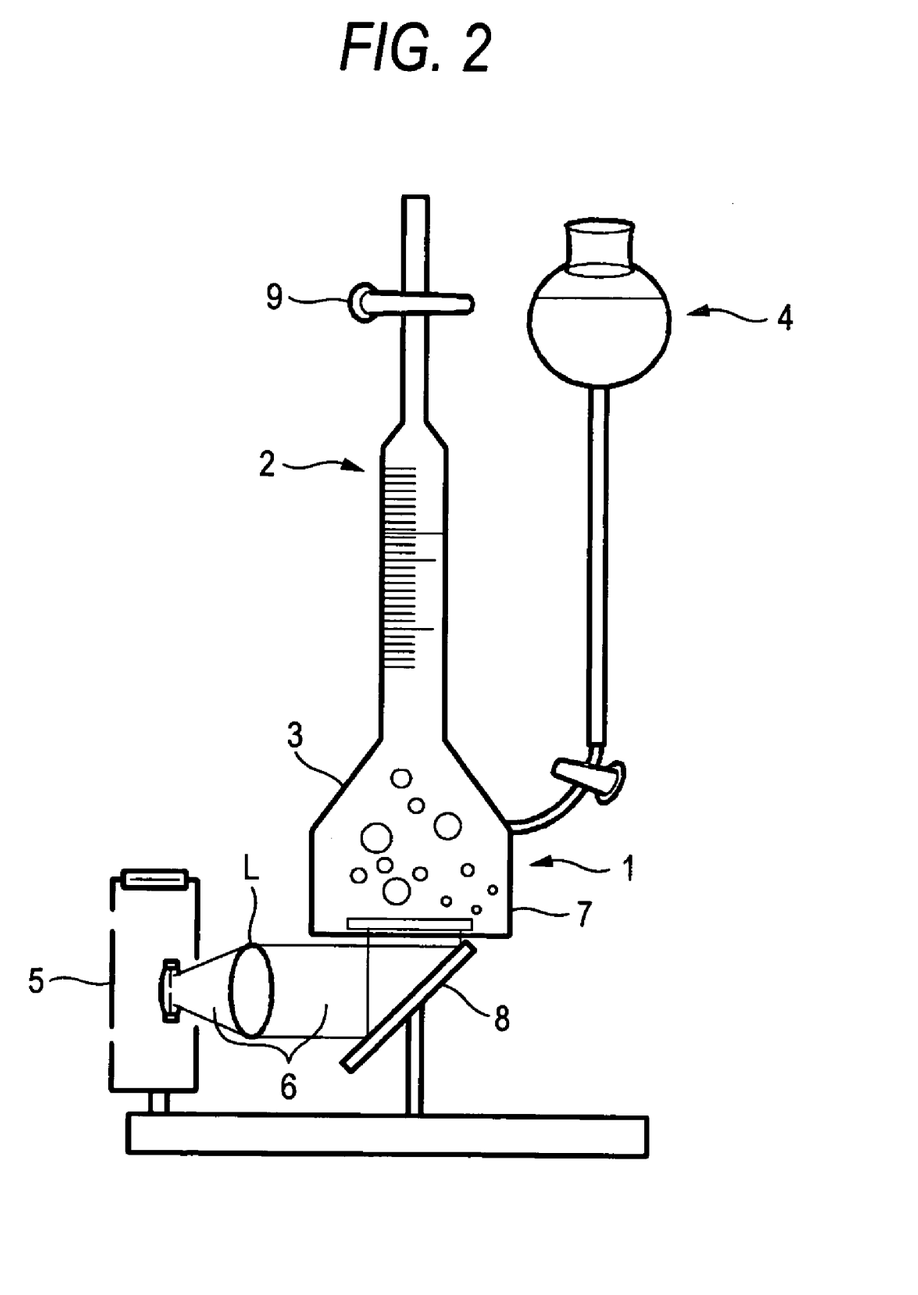
FIG. 2 is a diagram showing the construction of a device used for measuring the amount of hydrogen generated.

The device used for measuring the amount of hydrogen generated is shown in FIG. 2. The device is composed of a light responding portion made of quartz glass, a hydrogen measuring portion 2 for measuring the amount of hydrogen generated, a solution reservoir 4 for storing an aqueous solution 3 of sodium sulfide corresponding in volume to the hydrogen gas generated and thereby preventing a hydrogen pressure elevation, a 500 W Xe lamp 5 for emitting pseudo-solar light, a lens L for collecting pseudo-solar light 6, and a reflecting mirror 8 for reflecting the pseudo-solar light 6 and irradiating a photocatalyst 7 therewith, as shown in FIG. 2. When a reaction for decomposition by light is started, the whole system is filled with the aqueous solution 3 of sodium sulfide, a certain amount of photocatalyst 7 is caused to settle at the bottom of the light responding portion 1, a port 9 for collecting generated gas is closed and the 500 W Xe lamp is turned on. The amount of hydrogen generated is measured by the hydrogen measuring portion 7 at specific intervals of time of irradiation.

<Results of Tests for Measuring the Amounts of Hydrogen Generated>

Figure 3:
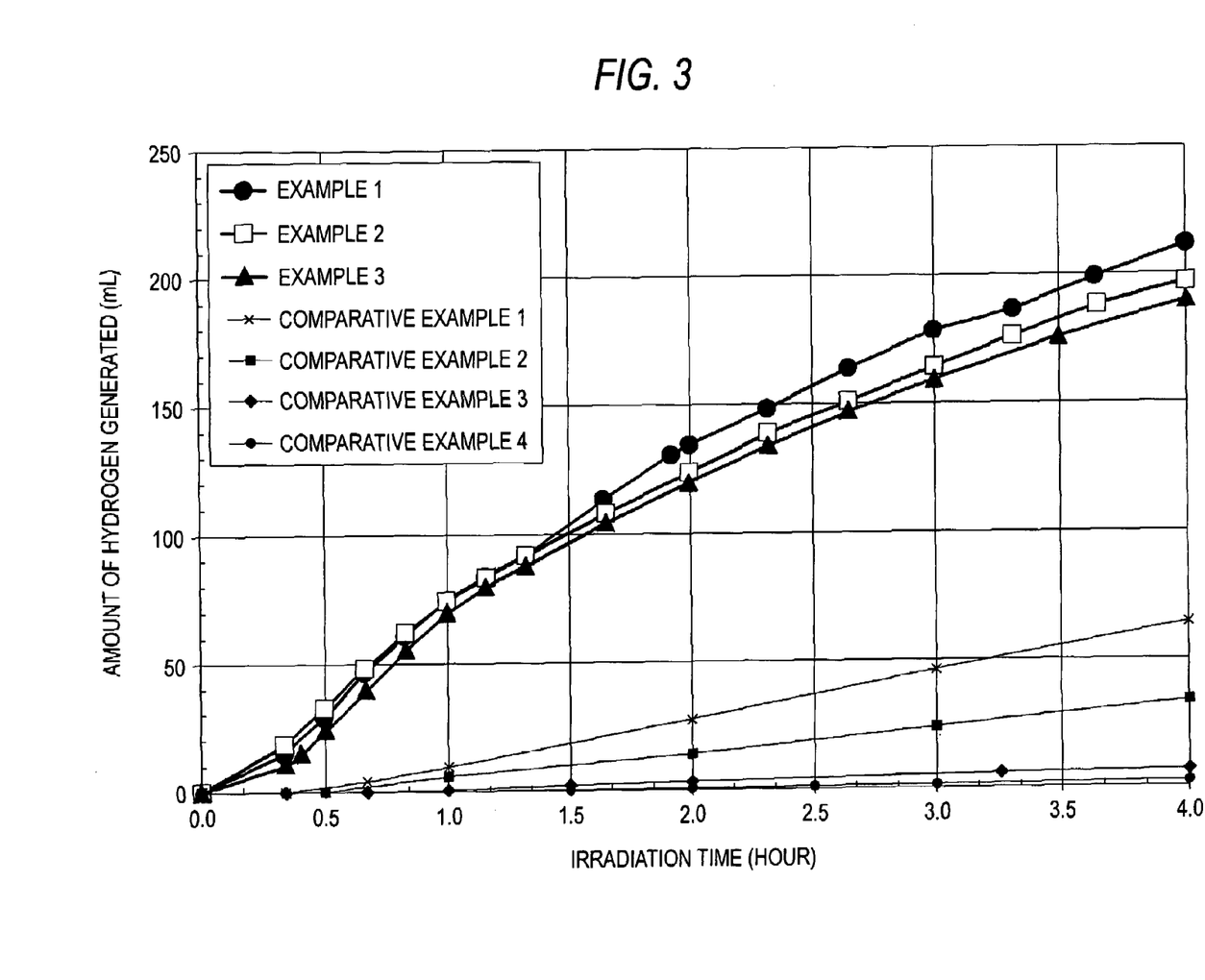
FIG. 3 is a graph comparing the photocatalysts of this invention and conventionally available photocatalysts in their capacity for generating hydrogen.

FIG. 3 shows the dependence of the amount of hydrogen generated on the length of time of visible light irradiation. As is obvious from the graph showing a comparison of capacity, all of the photocatalysts according to the Examples of this invention showed satisfactory results as stated above, but the results of the tests for measuring the amounts of hydrogen generated by the photocatalysts according to the Comparative Examples were all unsatisfactory.

It is particularly to be noted that the photocatalyst particles according to Example 1 showed a maximum hydrogen generating rate of 74.8 ml/h one hour after the start of irradiation and a total amount of 210.3 ml for the hydrogen generated during four hours after the start of irradiation, and that the photocatalyst particles according to Example 3 showed a maximum hydrogen generating rate of 70.8 ml/h one hour after the start of irradiation and a total amount of 189.2 ml for the hydrogen generated during four hours after the start of irradiation.

INDUSTRIAL APPLICABILITY

As is obvious from the foregoing description, the photocatalyst of this invention is high in catalytic activity, is non-toxic, has a long life, allows visible light to be used directly for its photocatalytic reaction and is useful for, hydrogen generation, etc.

The photocatalyst of this invention contributes to solving an environmental problem and exhibits the practical advantages of, for example, permitting the inexpensive production of useful substances if it is used in a method of decomposing hydrogen sulfide to produce hydrogen and sulfur.

The invention claimed is:

1. A photocatalyst comprising a capsule structure which comprises a cadmium compound shell and a void and having an average particle diameter of 50 nm or less.

2. The photocatalyst according to claim 1, wherein the cadmium compound is cadmium sulfide.

3. The photocatalyst according to claim 1, characterized by supporting a Group 8 to 11 metal.

4. The photocatalyst according to claim 3, characterized in that the metal is platinum.

5. The photocatalyst according to claim 1, which has a pore extending from its surface to its interior.

6. The photocatalyst according to claim 5, which has a multiplicity of such pores.

7. A process for producing a photocatalyst comprising a capsule structure which comprises a cadmium compound shell and a void, said process comprising:
dropping a solution of a cadmium salt into a solution of a sodium compound to first form a microscopic solid phase of cadmium hydroxide, which then turns into a cadmium compound instantaneously to form the shell of the capsule of the photocatalyst; and
obtaining a photocatalyst comprising a capsular structure, which comprises a cadmium compound shell and void.

8. The process for producing a photocatalyst according to claim 7, wherein the solution of a sodium compound contains sodium sulfite.

9. The process for producing a photocatalyst according to claim 7, wherein the solution of a sodium compound contains sodium sulfide.

10. The process for producing a photocatalyst according to claim 7, wherein the cadmium salt is cadmium nitrate.

11. A process for producing a photocatalyst comprising a capsule structure, which comprises a cadmium compound shell and a void and having an average particle diameter of 100 nm or less, said process comprising:
admixing a solution of a sodium compound in a suspension of particles of a cadmium compound; and
obtaining a photocatalyst comprising a capsular structure, which comprises a cadmium compound shell and void.

12. The process for producing a photocatalyst according to claim 11, wherein the cadmium compound is cadmium hydroxide.

13. The process for producing a photocatalyst according to claim 11, wherein the cadmium compound is cadmium oxide.

14. The process for producing a photocatalyst according to claim 11, wherein the suspension of particles of a cadmium compound is prepared by mixing a solution of cadmium nitrate with a solution containing sodium hydroxide.

15. The process for producing a photocatalyst according to claim 14, wherein the solution containing sodium hydroxide contains a chloride.

16. The process for producing a photocatalyst according to claim 15, wherein the chloride is sodium chloride.

17. The process for producing a photocatalyst according to claim 11, wherein the sodium compound is sodium sulfide.

18. The process for producing a photocatalyst according to claim 7 or 11, wherein photocatalyst particles as obtained are caused to support a Group 8 to 11 metal.

19. The process for producing a photocatalyst according to claim 18, wherein the metal is platinum.

20. The process for producing a photocatalyst according to claim 7 or 11, which further comprises suspending photocatalyst particles as obtained in a solution containing sodium sulfite and applying light thereto.

21. The process for producing a photocatalyst according to claim 20, wherein the light is visible light.

22. The process for producing a photocatalyst according to claim 20, wherein the light is solar or pseudo-solar light.

* * * * *